United States Patent [19]

Anderson et al.

[11] Patent Number: 5,035,671
[45] Date of Patent: Jul. 30, 1991

[54] DUAL PISTON PORTIONER AND CASING DEVICE

[75] Inventors: James E. Anderson, Prairie Village; Wendell Dennis; Richard Powers, both of Overland Park, all of Kans.

[73] Assignee: Marlen Research Corporation, Overland Park, Kans.

[21] Appl. No.: 557,930

[22] Filed: Jul. 25, 1990

[51] Int. Cl.$^5$ ............................................. A22C 11/04
[52] U.S. Cl. ........................................ 452/37; 452/35; 452/40; 452/42
[58] Field of Search ................... 452/35, 370, 40, 42, 452/38

[56] References Cited

U.S. PATENT DOCUMENTS

| | | | |
|---|---|---|---|
| 4,060,349 | 11/1977 | Piereder | 417/482 |
| 4,188,767 | 2/1980 | Piereder | 53/122 |
| 4,417,434 | 11/1983 | Piereder | 17/49 |
| 4,565,054 | 1/1986 | Piereder | 452/42 |
| 4,570,301 | 2/1986 | Beckman et al. | 452/35 |
| 4,582,103 | 4/1986 | Piereder | 141/238 |
| 4,642,849 | 2/1987 | Piereder | 17/49 |
| 4,651,498 | 3/1987 | Piereder | 53/112 |

FOREIGN PATENT DOCUMENTS 1068543 12/1979 Canada ................................. 99/199
1117360 2/1982 Canada ............................. 99/191.6

Primary Examiner—Frederick R. Schmidt
Assistant Examiner—Lawrence Cruz
Attorney, Agent, or Firm—Hovey, Williams, Timmons & Collins

[57] ABSTRACT

A dual piston device (10) for handling and casing of flowable materials such as whole muscle meat products is provided which eliminates the problem of tailing, or creation of a tail of meat product extending outwardly from a casing adjacent an endmost clip. The device (10) includes a transfer conduit (20) having a slidable transfer piston (26) therein, together with an auxiliary conduit (34) connected to the transfer conduit (20) intermediate the ends thereof. The auxiliary conduit (34) is equipped with a deaerating severing piston (42). The pistons (42, 26) are configured to mate and coact so as to cleanly sever whole muscle meat pieces which may otherwise lie in the open end of a casing in the region thereof to be clipped. A stuffing horn assembly (14) is positioned adjacent the outlet (22) of transfer conduit (20); a stuffing horn (69) forming a part of the assembly (14) may be pivoted outwardly to receive a fresh casing (88), whereupon the horn (69) is pivoted back into alignment with trnasfer conduit (20) to receive a fresh meat portion into the casing (88).

14 Claims, 5 Drawing Sheets

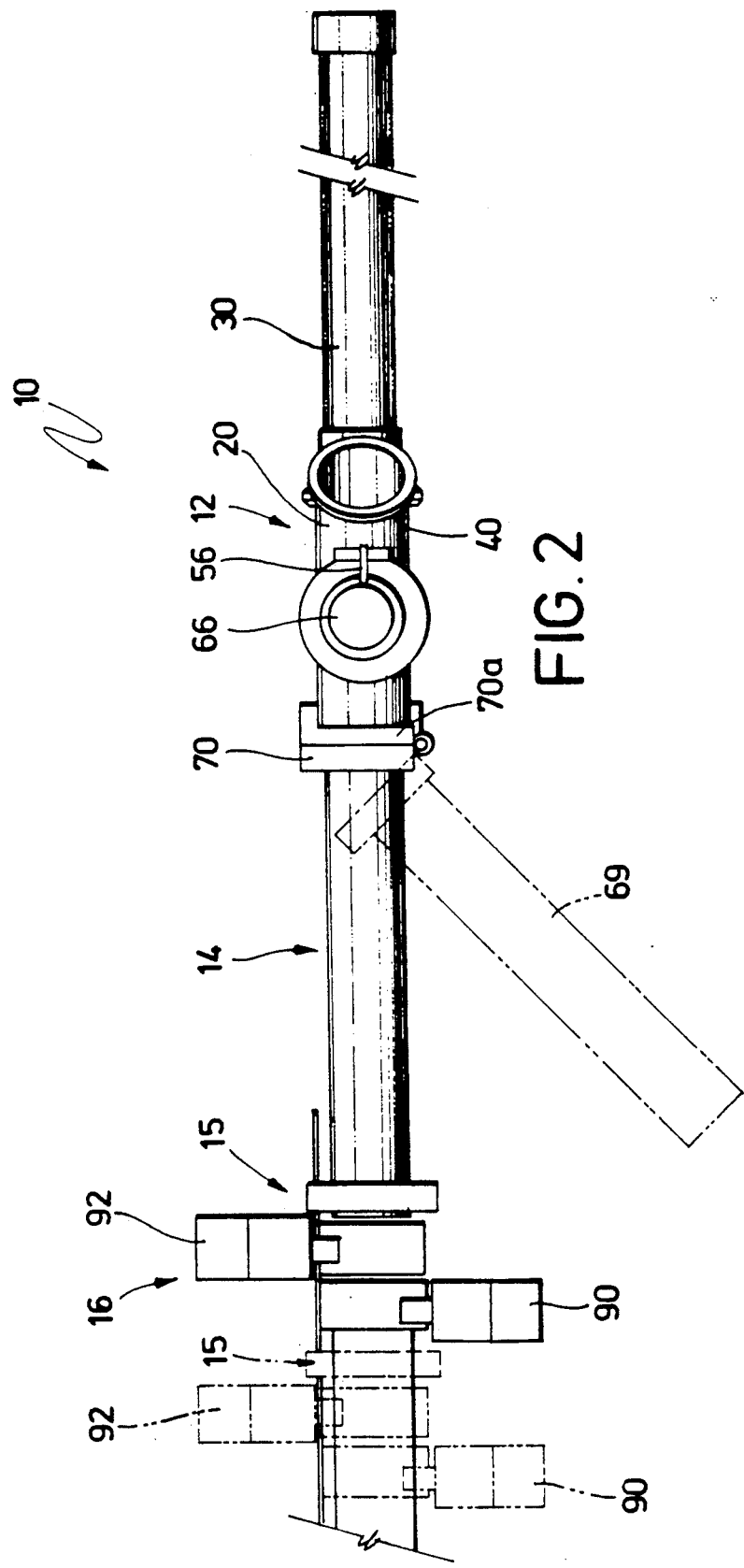

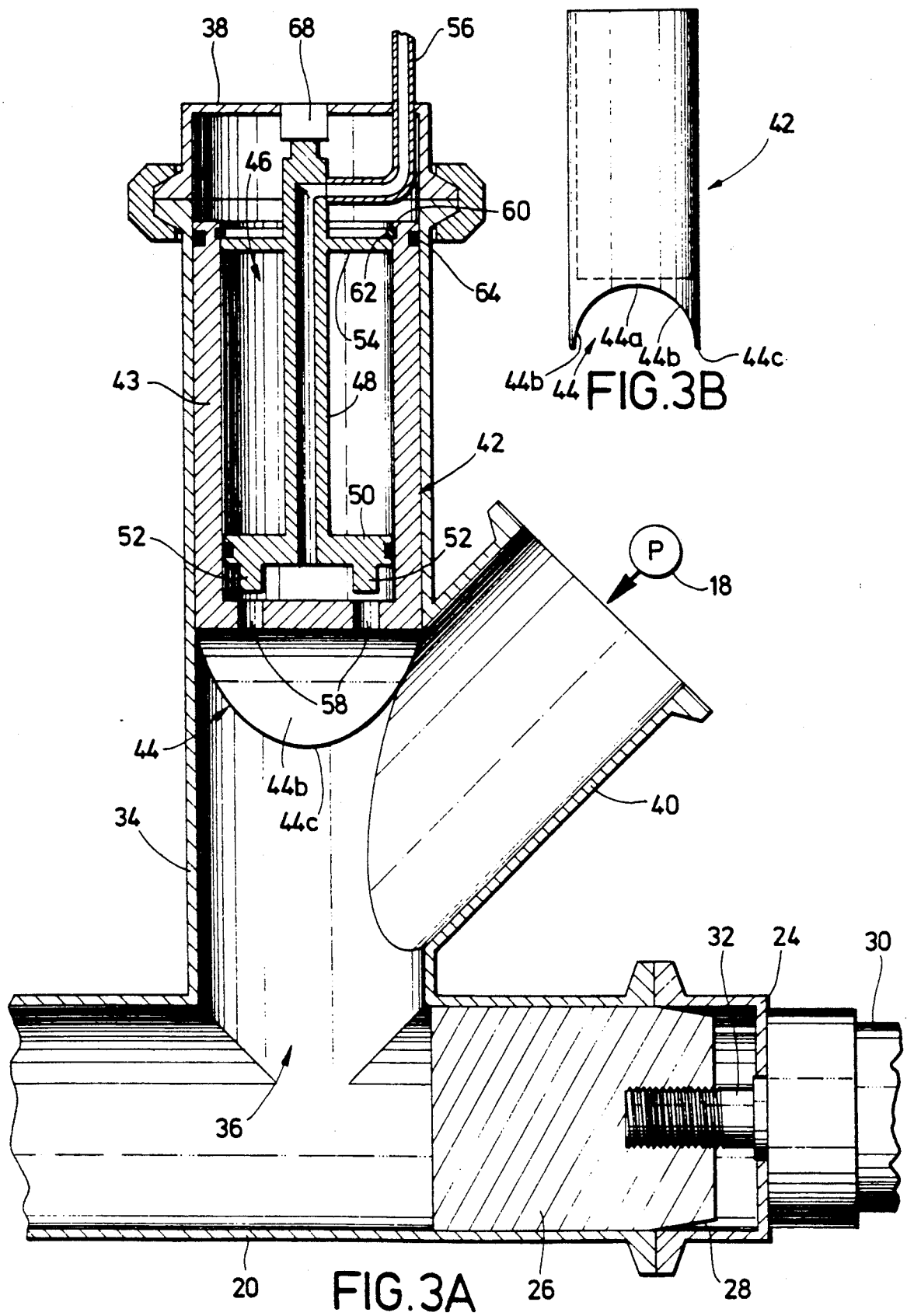

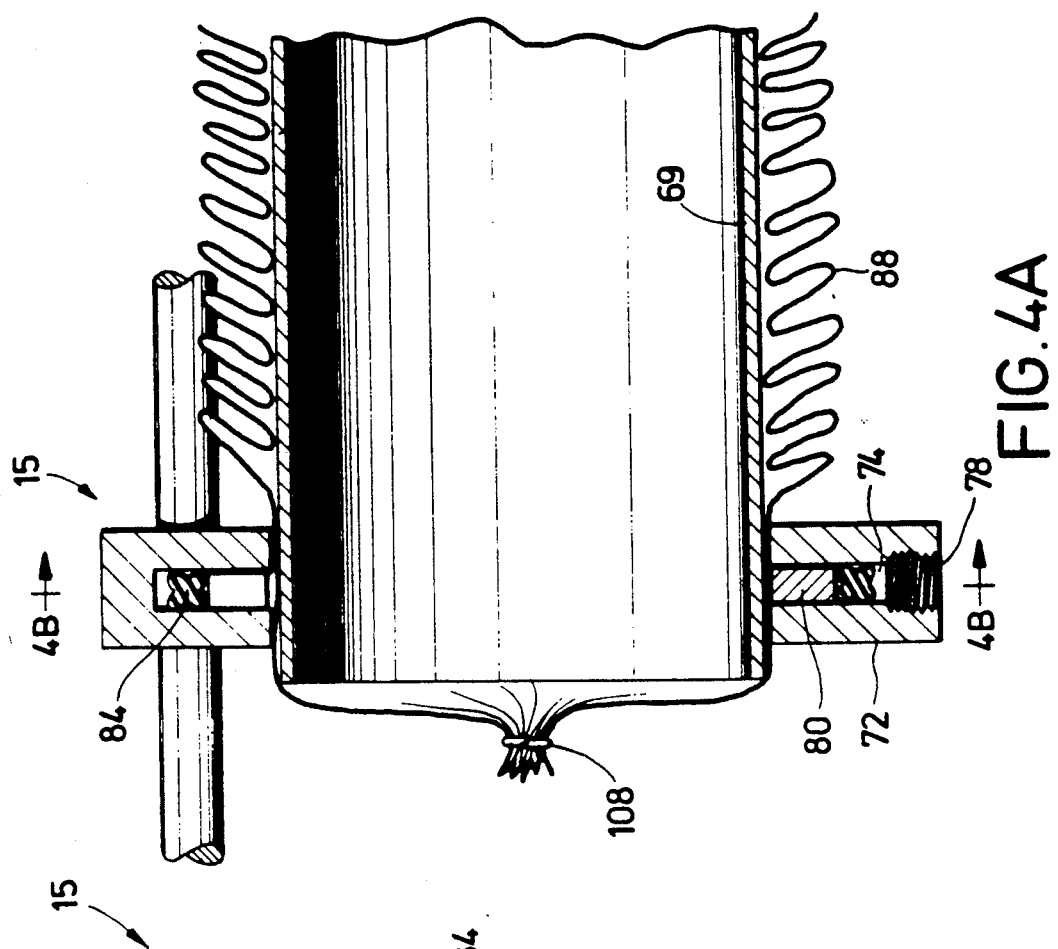
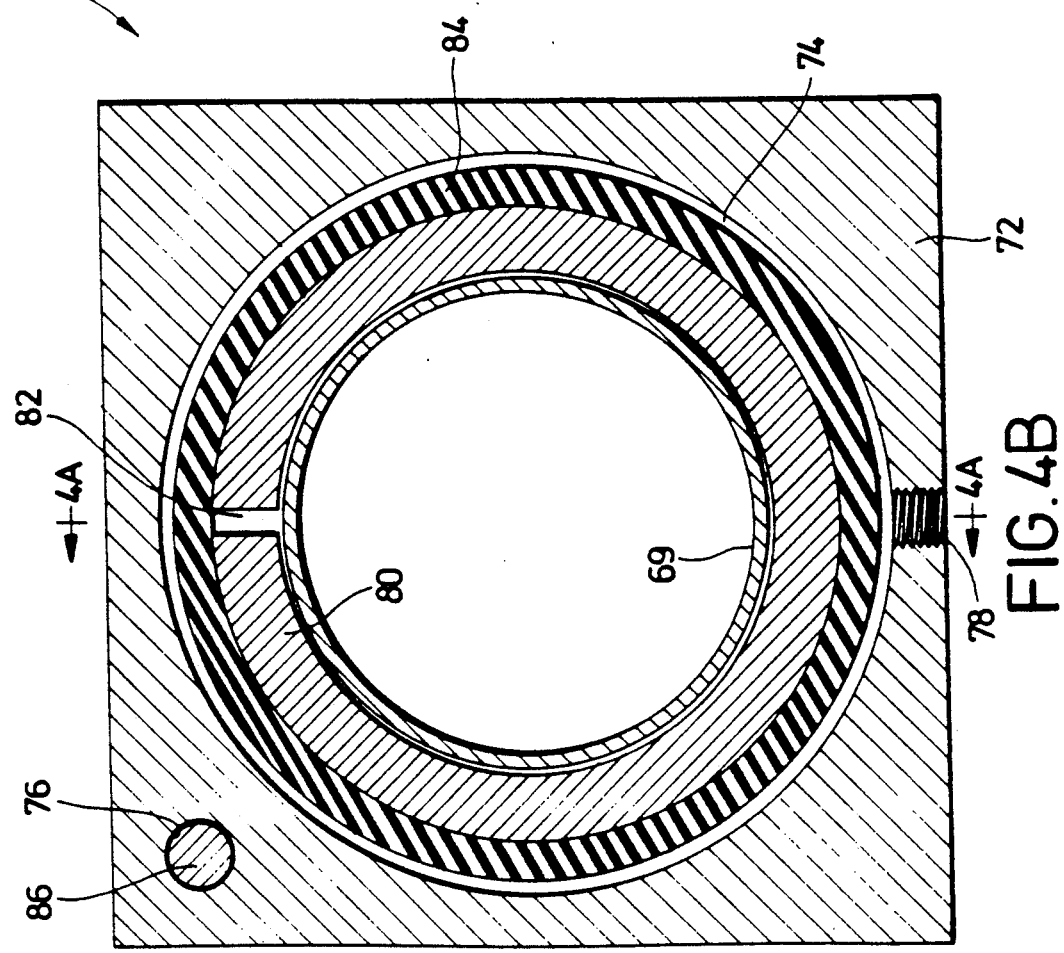

DUAL PISTON PORTIONER AND CASING DEVICE

BACKGROUND OF THE INVENTION

1. Field of the Invention

The present invention is broadly concerned with a dual piston device for the accurate portioning and casing of a flowable material such as meat. More particularly, it is concerned with such a dual piston device which, by provision of a pair of coacting, mated pistons, eliminates rejected, cased portions of whole muscle products such as hams which may result from clipping of a portion directly through a piece of whole muscle product.

2. Description of the Prior Art

Whole muscle products such as hams and beef briskets are often placed within protective casings for sale to the consuming public. Typically, casing of these products involves conveying whole muscle pieces of the meat of correct total weight into conventional casings, followed by a clipping operation wherein the ends of the casing are gathered and a circular metallic staple is applied. It sometime occurs (and particularly in automated casing operations) that the final weight for a given portion to be cased is reached with an integral whole muscle piece of meat lying in the open end of the casing in the region to be clipped. As a consequence clipping through a piece of whole muscle meat leaves a "tail" of meat extending out of the casing. This is objectionable both from aesthetic and sanitary points of view, and generally means that the cased product portion must be rejected.

Prior automated portioning/casing devices have failed to adequately address the foregoing problem. That is, while such prior devices are generally adequate for handling and casing of comminuted meats such as hamburgers and sausages, they simply make no provision for proper handling of whole muscle products while avoiding the inherent difficulty of tailing. Prior portioning and casing devices are disclosed in U.S. Pat. Nos. 4,060,349; 4,188,767; 4,417,434; 4,582,103; 4,642,849; and 4,651,498.

SUMMARY OF THE INVENTION

The present invention overcomes the problems outlined above and provides a greatly improved automated portioner/casing device particularly suited for handling of whole muscle meat products, although it will work equally well with other types of flowable materials such as comminuted meats.

Broadly speaking, the device of the invention is adapted for connection between an upstream pump and a downstream processing unit (e.g., a casing horn) and includes a pair of interconnected conduits each including therein a reciprocable piston. One of the conduits is provided with a product inlet adapted for coupling with a pump, whereas the other conduit presents the outlet for the device.

In more detail, the device of the invention includes an elongated transfer conduit having a forward material outlet end adapted for connection with a casing horn or similar unit, and an opposed, rearward end; an elongated auxiliary conduit is operatively coupled with and in communication with the transfer conduit between the opposed ends of the latter, with the auxiliary conduit having a material outlet end adjacent the transfer conduit, and structure defining a material inlet adapted to be coupled with an upstream pump. A severing piston is slidably disposed within the auxiliary conduit and is advantageously configured to present an arcuate underside of inverted, saddle-like shape, whereas a generally cylindrical transfer piston is shiftably positioned within the transfer conduit. The severing and transfer pistons are designed to mate and effectively coact when the severing piston is positioned adjacent the transfer conduit, so as to cooperatively and cleanly sever whole muscle meat pieces which could otherwise create tailing problems in finished casings. Respective pneumatic piston and cylinder assemblies are employed for sequential movement of the severing and transfer pistons.

In preferred forms, a tubular stuffing horn assembly is positioned downstream of the transfer conduit outlet and is in the form of an elongated stuffing horn adapted to telescopically receive a casing over the outer end thereof. The horn may be equipped with apparatus for deaerating the casing, and moreover, may be swingably mounted adjacent the end of the transfer conduit to facilitate loading of casings thereon.

BRIEF DESCRIPTION OF THE DRAWINGS

FIG. 2 is a plan view of the apparatus depicted in FIG. 1, and showing the pivotal stuffing horn in the loading and use positions thereof;

FIG. 3A is an enlarged, fragmentary, vertical sectional view illustrating the details of construction of the transfer and auxiliary conduits of the handling apparatus, together with the internal pistons thereof;

FIG. 3B is a schematic elevational view illustrating the configuration of the severing piston within the auxiliary conduit;

FIG. 4A is fragmentary sectional view taken along line 4A—4A of FIG. 4B and illustrating the outboard end of the stuffing horn with a casing mounted thereover, and showing a circumferential sizing ring mounted about the stuffing horn;

FIG. 4B is a vertical sectional view taken along 4B—4B of FIG. 4A;

DESCRIPTION OF THE PREFERRED EMBODIMENTS

Figure 1:
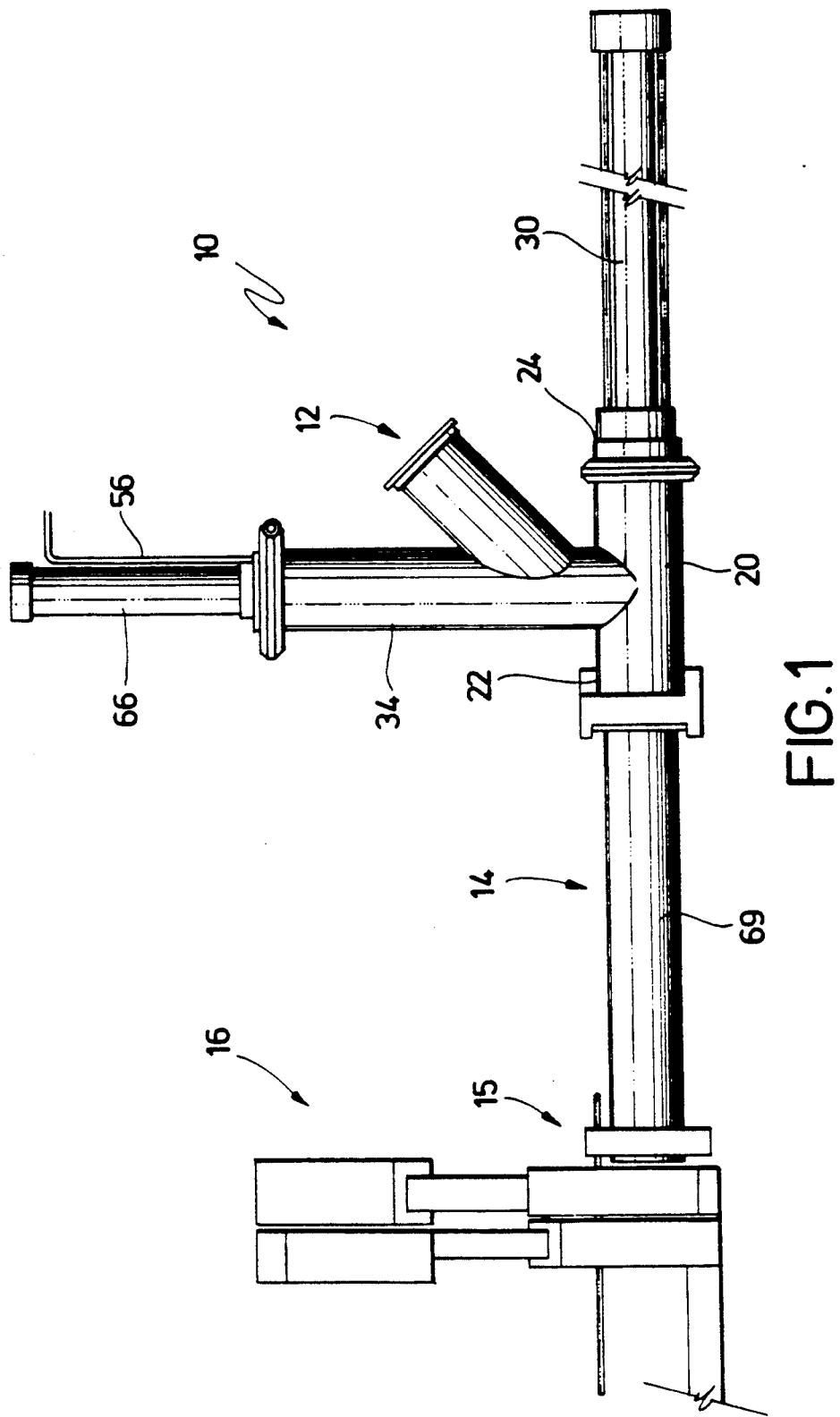
FIG. 1 is a side elevational view of a preferred handling/casing apparatus in accordance with the invention.

Turning now to the drawings, particularly FIGS. 1-2, it will be seen that an overall handling/casing device 10 for flowable materials such as meat, and particularly whole muscle meat, is illustrated. The device 10 broadly includes a dual conduit handling and portioning assembly 12, a stuffing horn assembly 14, sizing ring member 15 and a casing clipping mechanism 16. The device 10 is adapted to be coupled to an upstream pump 18 (see FIG. 3A) in order to produce accurately portioned, cased final products.

In more detail, the assembly 12 includes an elongated, horizontally disposed, tubular transfer conduit 20 presenting a forward outlet end 22 as well as an opposed apertured cap rearward end 24. A generally cylindrical transfer piston 26 is slidably positioned within conduit 20 and has a converging, tapered rearmost end 28. Fore and aft selective movement of piston 26 is provided by means of pneumatic piston and cylinder assembly 30, with the piston rod 32 of the latter extending through end 24 of conduit 20 and being threadably secured to piston 26. The assembly 12 further includes an upright auxiliary conduit 34 which is interconnected and in communication with the interior of transfer conduit 20 between the opposed ends of the latter as illustrated. The conduit 34 includes a material outlet end 36 which opens into transfer conduit 20, as well as an opposed, apertured cap uppermost end 38. In addition, the conduit 34 is provided with an obliquely disposed material inlet pipe 40, the innermost end of which is proximal to outlet end 36.

A severing piston 42 is situated within auxiliary conduit 34 and is vertically shiftable therein. The piston 42 is in the form of a tubular, hollow body presenting an upwardly opening body section 43 and an arcuate lowermost end 44 of inverted, saddle-like shape (see FIG. 3B). That is to say, the end 44 presents an arcuate uppermost segment 44a, together with a pair of opposed, diverging segments 44b terminating in a pair of lowermost arcuate lips 44c.

The overall piston 42 is further provided with deaerating structure broadly referred to by the numeral 46, serving to deaerate meat fed from pump 18 into auxiliary conduit 34. The structure 46 includes a central, vertically extending, annular shaft 48 having a radially enlarged, circular, lowermost plate 50 adjacent the bottom thereof. The plate 50 is provided with a pair of depending projections 52, as shown. An upper, radially enlarged circular plate 54 is provided adjacent the upper end of shaft 48 as well. An elongated, somewhat Z-shaped pipe 56 is secured to the extreme upper end of shaft 48 above plate 54, with the pipe 56 being in communication with the interior of the shaft. As best seen in FIG. 3A, the pipe 56 passes through and is slidable with respect to uppermost end 38 of auxiliary conduit 34. The exterior end of pipe 56 (see FIG. 1) is coupled to a vacuum source (not shown) for purposes to be made clear hereinafter.

The deaerating structure 46 apart from pipe 56 is housed within the hollow section 43 of piston 42. The latter includes a pair of openings 58 passing through central segment 44A of the piston body, with the openings 58 being oriented for receiving projections 52 during operation of the severing piston 42. The upper end of the piston body 43 has an internal lip 60 which receives a snap ring 62; the latter serves to retain the deaerating structure 46 within the piston body. In addition, a flexible sealing ring 64 is disposed about the exterior of the piston sidewall and contacts the inner surface of conduit 34.

Up and down movement of severing piston 42 is effected by means of a conventional pneumatic piston and cylinder assembly 66 (FIG. 1) mounted atop and extending upwardly from end 38 of conduit 34. A connector 68 serves to couple the upper end of shaft 48 with the extensible piston rod of assembly 66 so that movement of the piston rod correspondingly moves shaft 48 and, as a result thereof, the entirety of piston 42.

Figure 5B:
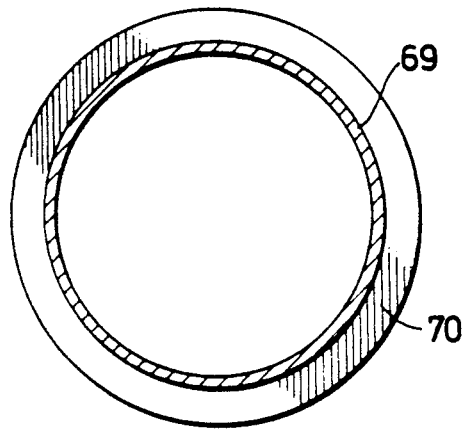
FIG. 5B is a vertical sectional view taken along line 5B—5B of FIG. 5A.
Figure 5A:
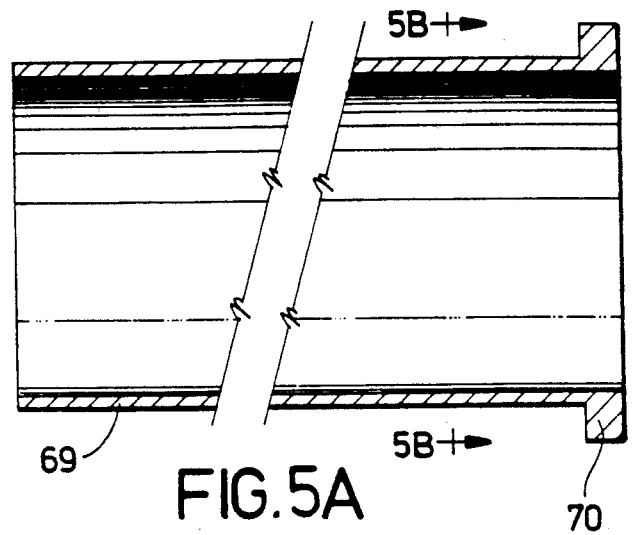
FIG. 5A is a fragmentary vertical sectional view of a simplified casing horn.

Stuffing horn assembly 14 is in the form of an elongated, tubular horn 69 having a rearward end flange 70. The rearward end flange 70 is pivotally coupled to a mating flange 70a affixed to outlet end 22 of transfer conduit 20, so that horn 69 may be selectively pivoted about an upright axis between a casing loading position shown in full lines in FIG. 2 and a casing filling position illustrated in FIG. 1. In the latter position it will be of course appreciated that material conveyed from outlet end 22 passes into and through horn 69. The particular horn 69 illustrated in FIGS. 1-2 is further shown in FIGS. 5A and 5B.

The construction of sizing ring member 15 is best understood from a consideration of FIGS. 4A and 4B. Member 15 includes an outermost, square in elevation and U-shaped in cross section metallic frame 72 which presents a large, central opening 74, a smaller, guide rod-receiving opening 76, and a threaded bore 78. An innermost, circular metallic gripping ring 80 is positioned within frame 72 and is laterally confined by the latter. As best seen in FIG. 4B, the gripping ring 80 is slotted as at 82, thereby permitting circumferential constriction of the same. A resilient synthetic resin "quad" sealing ring 84 is positioned outboard of and in engagement with gripping ring 80. A source of pressurized air (not shown) is coupled to member 15 by means of a fitting (also not shown) threadably inserted within bore 78. A guide rod 86, supported on the frame of the overall device 10, passes through opening 76 in order to guide the fore and aft shifting of the entire ring assembly 15. In the use position of assembly 15 depicted in FIG. 4A, it will be observed that a casing 88 is loosely positioned over the outermost end of horn 69, with the assembly 15 being shifted over the horn end and in circumferentially surrounding relationship to casing 84. When not in use, the assembly 15 may be retracted to the position depicted in phantom in FIG. 2, permitting outward pivoting of horn 69.

Casing clipping mechanism 16 is entirely conventional and, in the form shown, includes a pair of separate casing clippers 90 and 92 each designed to apply a metallic clip to an end of a casing. The clippers 90, 92 are mounted on a track assembly (not shown) permitting the clippers to be retracted to the position shown in phantom in FIG. 2 wherein the horn 69 is allowed to pivot for loading of a casing on the outer end thereof. A variety of commercially available clippers can be used in the context of the invention, for example Tipper Tie Models Nos. Z4119L and Z4119R.

Pump 18 can also be selected from a variety of available pumps. However, dual piston pumps of the type commercialized by Marlen Research Corporation of Overland Park, Kansas are particularly preferred. Pumps of this character are described in U.S. Pat. Nos. 4,097,962, 3,456,285 and 4,869,655, all of which are incorporated by reference herein.

Figure 6B:
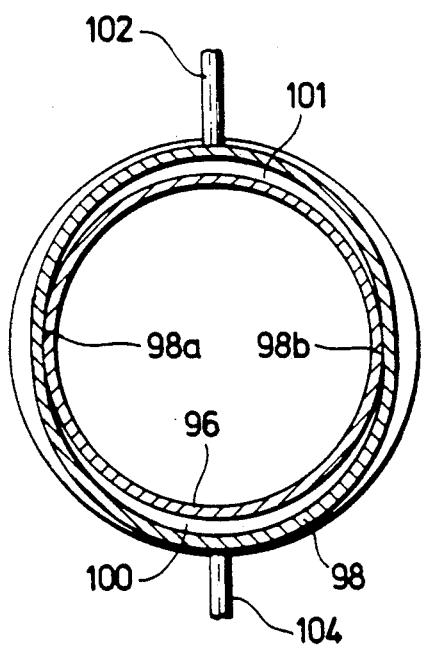
FIG. 6B is a vertical sectional view taken along line 6B—6B of FIG. 6A.
Figure 6A:
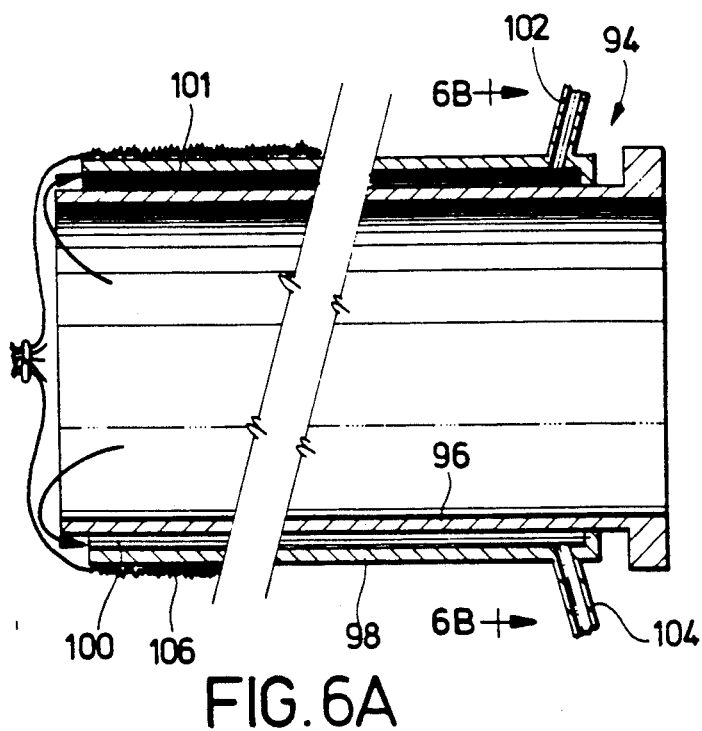
FIG. 6A is a vertical sectional view of illustrating a stuffing horn equipped with means for deaerating a casing.

FIGS. 6A and 6B illustrate another type of stuffing horn 94 which may be used in the present invention. The horn 94 includes an inner, tubular, material conveying tube 96, together with a concentric, outer shell-defining member 98 surrounding tube 96 and being secured thereto at points 98A and 98B (see FIG. 6B). The member 98, in cooperation with inner tube 96, presents a pair of opposed, upper and lower, arcuate in cross section deaerating chambers 100, 101 each having an open outer end adjacent the outer end of tube 96. A pair of pipes 102, 104 are respectively in communication with the chambers 101, 100 and are coupled to vacuum sources (not shown). When a casing 106 is passed over horn 94 as shown in FIG. 6A, a vacuum can be drawn via the pipes 102, 104 so as to deaerate the casing during filling operations. In all other respects, the use of horn 94 is identical to that of horn 69.

The overall operation of device 10 can best be described with reference to FIGS. 1-3A. It will first be assumed that a casing operation has been completed, with transfer conduit 20 being empty and horn 69 filled with meat. Also, transfer piston 26 would be retracted, and severing piston 42 elevated, to the respective positions thereof shown in FIG. 3A. In the first step, the clipping mechanism 16 is retracted leftwardly as viewed in FIG. 2, along with sizing member 15. In this position, horn 69 can be pivoted outwardly as shown in FIG. 2, whereupon a fresh casing is slipped over the end of the horn in a gathered fashion. The horn is then pivoted back in its use position in alignment with transfer conduit 20, and ring member 15 and clipping mechanism 16 are shifted rightwardly to the bold line position of FIG. 2. An initial clipping operation is then carried out, so as to apply a clip 108 (see FIG. 4A) to the casing end.

Pump 18 is then actuated for a period of time to deliver a properly weighted portion of meat into and through inlet pipe 40 and into the confines of auxiliary conduit 34. Of course, some of this portion will fall directly into transfer conduit 20 via outlet end 36, but the meat would also essentially fill the conduit 34 up to the end 44 of piston 42.

During passage of meat into conduit 34 and thereafter as necessary, a vacuum is drawn through pipe 56 and shaft 48, so as to deaerate the portion of meat delivered by pump 18. That is, air passes through the openings 58 and thence upwardly through shaft 48 and pipe 56 where it is exhausted.

The piston 42 is next shifted downwardly until the body 43 thereof completely blocks pipe 40 and the respective segments 44B enter the confines of transfer conduit 20. Lowering of the piston 42 in this fashion serves to push the entire charge of meat into transfer conduit 20; in addition, this action severs any whole muscle meat pieces situated within the lower outlet of pipe 40. It will also be appreciated that, upon lowering of the piston 42, the shaft 48 first travels downwardly until the projections 52 enter and fill the openings 58. This terminates the deaeration operation and clears the openings 58 of meat which may have accumulated therein.

In the next step, transfer piston 26 is moved leftwardly as viewed in FIG. 3A in order to move the charge of meat out of the conduit 20 and into horn 69. Inasmuch as the latter is full of meat, a properly weighted portion is then expelled into the casing 88, filling the latter. During such filling, pressurized air may be directed through bore 78 in order to cause constriction of gripping ring 80. This in turn creates an increasing gripping pressure on the casing as it is filled to ensure smooth, proper, complete filling thereof.

Leftward travel of transfer piston 26 also serves to cleanly sever any whole muscle pieces of meat which could ultimately create tailing problems in a finished casing. That is, the cylindrical transfer piston 26 coacts with the saddle-shaped lowermost end 44 of severing piston 42 so as to cleanly cut potentially troublesome whole muscle pieces of meat.

When the casing 88 is completely full of meat, the clipping mechanism 16 comes into play to clip the remaining open end of the casing. The completed, cased portion may then be removed.

The operation of device 10 continues in the manner outlined to create multiple cased portions. By virtue of the unique construction of the device 10, the problem of tailing is eliminated during such operations. Moreover, very accurate portions can be achieved, particularly when use is made of a Marlen pump as described.

We claim:

1. A device for handling a flowable material such as meat and discharging the same as discrete portions, said device being adapted for connection between an upstream material pumping means and a downstream processing unit designed to receive and handle said discrete portions, said portioning device comprising:
   an elongated transfer conduit having a forward material outlet end adapted for connection with said unit and an opposed, rearward end;
   an elongated auxiliary conduit operably coupled with and in communication with the interior of said transfer conduit between the opposed ends of the latter,
   said auxiliary conduit having a material outlet end adjacent said transfer conduit and structure defining a material inlet in communication with the interior thereof and adapted for connection with said pumping means;
   a severing piston slidably disposed within said auxiliary conduit;
   means operably coupled with said severing piston for selective movement thereof between a retracted position for open, material flow communication between said material inlet and the interior of said transfer conduit through the material outlet of the auxiliary conduit, and a closing position wherein the severing piston blocks said material flow communication;
   a transfer piston slidably positioned within said transfer conduit;
   means operably coupled with said transfer piston for selective movement thereof to a retracted position rearward of the material outlet end of the auxiliary conduit allowing flow of material into the transfer conduit, and for forward movement of the transfer piston towards said transfer conduit outlet end for delivery of material out said transfer conduit outlet.

2. The device of claim 1, said auxiliary conduit material inlet comprising an elongated inlet tube, the longitudinal axis of the inlet tube being oblique relative to the longitudinal axis of said auxiliary conduit.

3. The device of claim 1, said severing piston having an arcuate, concave bottom wall configured to partially extend into said transfer conduit and permit passage of said transfer piston therepast, when the severing piston is in the closing position thereof, said severing and transfer pistons coacting to cleanly sever material when the transfer piston moves past the severing piston.

4. The device of claim 1, said severing piston including structure for deaerating material within said portioning conduit.

5. The device of claim 1, said transfer piston moving means and said severing piston moving means each comprising an individual piston and cylinder assembly respectively coupled with a corresponding piston.

6. Apparatus for portioning and casing of meat, comprising:
   a portioning device adapted for coupling with meat pumping means, including—
   an elongated transfer conduit having a forward material outlet end and an opposed, rearward end;

an elongated auxiliary conduit operably coupled with and in communication with the interior of said transfer conduit between the opposed ends of the latter, said auxiliary conduit having a material outlet end adjacent said transfer conduit and structure defining a material inlet in communication with the interior thereof and adapted for connection with said pumping means;

a severing piston slidably disposed within said auxiliary conduit;

means operably coupled with said severing piston for selective movement thereof between retracted position for open, material flow communication between said material inlet and the interior of said transfer conduit through the material outlet of the auxiliary conduit, and a closing position wherein the severing piston blocks said material flow communication;

a transfer piston slidably positioned within said transfer conduit;

means operably coupled with said transfer piston for selective movement thereof to a retracted position rearward of the material outlet end of the auxiliary conduit allowing flow of material into the transfer conduit, and for forward movement of the transfer piston towards said transfer conduit outlet end for delivery of material out said transfer conduit outlet; and a stuffing horn assembly operably coupled with said device and comprising— an elongated, tubular stuffing horn having a defining sidewall, an inlet and an opposed open outlet end for telescopically receiving a casing thereover;

means mounting said horn with the inlet thereof in communication with the outlet end of said transfer conduit for passage of meat from the transfer conduit into and through said horn.

7. Apparatus as set forth in claim 6, said horn mounting means including structure swingably supporting said horn for selective movement thereof between a casing loading position permitting filing of a casing over said horn open end, and a casing filling position establishing said communication with said transfer conduit outlet end.

8. Apparatus as set forth in claim 6, including sizing means located adjacent said horn sidewall proximal to said open end, said sizing means including a compression body spaced outwardly of said horn sidewall for permitting the casing to be positioned over said open end and between the sidewall and body, and means operably coupled with said body for pressing the same against said casing to hold the same on said horn during filling of the casing.

9. Apparatus as set forth in claim 8, said body comprising a ring in circumscribing relationship to said horn sidewall.

10. Apparatus as set forth in claim 8, said body pressing means including structure for pneumatically pressing the body against said casing.

11. Apparatus as set forth in claim 6, said auxiliary conduit material inlet comprising an elongated inlet tube, the longitudinal axis of the inlet tube being oblique relative to the longitudinal axis of said auxiliary conduit.

12. Apparatus as set forth in claim 6, said severing piston having an arcuate, concave bottom wall configured to partially extend into said transfer conduit and permit passage of said transfer piston therepast, when the severing piston is in the closing position thereof, said severing and transfer pistons coacting to cleanly sever material when the transfer piston moves past the portioning piston.

13. Apparatus as set forth in claim 6, said severing piston including structure for deaerating material within said portioning conduit.

14. Apparatus as set forth in claim 6, said transfer piston moving means and said severing piston moving means each comprising an individual piston and cylinder assembly respectively coupled with a corresponding piston.

* * * * *